2,944,039

METHOD FOR PREPARING HOMOGENEOUS COMPOSITION COMPRISING OXIDIZED PETROLEUM WAX AND A POLYMER OF A MONOVINYL AROMATIC COMPOUND

Samuel E. Jolly, Ridley Park, Pa., assignor to Sun Oil Company, Philadelphia, Pa., a corporation of New Jersey No Drawing. Filed Nov. 7, 1957, Ser. No. 694,917

4 Claims. (Cl. 260—28.5)

This invention relates to the preparation of compositions from partially oxidized petroleum wax, and to the compositions thereby obtained.

It is known in the art to partially oxidize petroleum wax to obtain products having elevated saponification number, e.g. at least 30 mg. of KOH per gram, and typically in the range from 50 to 150 mg. of KOH per gram. Such products are useful in various applications, e.g. as a constituent of emulsion polish compositions. The latter compositions may comprise for example an emulsion of oxidized wax, e.g. oxidized microcrystalline wax, in water, a suitable emulsifying agent being used to prepare the emulsion, e.g. an amine soap such as triethanolamine or a morpholine soap of a carboxylic acid such as stearic, oleic, linoleic, lauric, palmitic, or other organic acid. The saponifiable portion of the oxidized wax has emulsion-promoting characteristics and assists in the formation of the emulsion.

A highly important property of oxidized wax is its hardness. For example, such oxidized wax for use in various applications, such as in emulsion polish compositions, preferably has hardness corresponding to a penetration at 77° F. (A.S.T.M. Method No. D217-44T) of less than 10, and more preferably less than 5, since harder waxes produce a more durable finish upon application of the polish to the surface to be waxed and evaporation of the water to leave a wax film.

Oxidized waxes, as originally prepared by oxidation, frequently have penetration substantially above the desired penetration. Accordingly, it is desirable to reduce the penetration of such oxidized waxes to that required for satisfactory use in various applications.

According to the present invention, compositions having very low penetration are prepared from oxidized wax by procedure including contacting the latter for a substantial period of time with a monovinyl aromatic compound under conditions normally productive of polymerization of such monovinyl aromatic compounds. It has been found that a saponifiable product, into which the oxidized wax and monovinyl aromatic compound have been incorporated, having very low penetration, can be obtained.

It is frequently desirable to limit the amount of monovinyl aromatic compound polymer in the product of the polymerization of monovinyl aromatic compound in the presence of oxidized wax. For example it is frequently desired that the amount of monovinyl polymer not exceed about 35 weight percent of the total composition. It is found however that homogeneous compositions containing relatively small amounts of vinyl compound polymer relative to oxidized wax cannot be obtained by ordinary methods. For example when polymerizing a mixture having a ratio of oxidized wax to vinyl compound polymer of 2:1, 3:1, 4:1, etc. a non-homogeneous product is obtained which at room temperature exists as separate phases, one concentrated with respect to vinyl compound polymer and the other concentrated with respect to oxidized wax. It is also found that polymerization of vinyl aromatic compound in the absence of oxidized wax, followed by blending of the polymer with oxidized wax, also fails to produce a homogeneous composition.

According to the present invention, compositions containing relatively small amounts of vinyl compound polymer are obtained by a plural stage process which involves first the polymerization of a mixture of a vinyl compound and oxidized wax, followed by blending of the product with additional oxidized wax. Sufficiently small amounts of oxidized wax are employed in the polymerization mixture that a homogeneous product is obtained. Usually the ratio of oxidized wax to vinyl compound is not greater than about 1.5:1. On the other hand, the ratio is usually not less than about 1:5. The polymerization product is blended with a sufficient additional amount of oxidized wax to produce a composition wherein the proportion of the composition which is attributable to the vinyl compound polymer is at the desired level, preferably within the approximate range from 5 to 35%, more preferably 10 to 30%. The proportion attributable to such polymer is that proportion of vinyl compound polymer which the composition contains assuming that the latter is a physical mixture of oxidized wax with a homopolymer of the vinyl compound. Whether this assumption is correct, or whether the composition contains a reaction product of vinyl compound with the oxidized wax is not definitely known, and is not essential to the invention.

The monovinyl aromatic compound employed according to the invention is one having the formula:

where R is hydrogen, methyl or ethyl, A is hydrogen or halogen or an alkyl radical having not more than three carbon atoms, and B is hydrogen or halogen or an alkyl radical having not more than three carbon atoms. Examples of suitable monovinyl aromatic compounds are styrene, o-methyl styrene, p-methyl styrene, o-ethyl styrene, p-ethyl styrene, o,p-dimethyl styrene, o,p-diethyl styrene, p-chlorostyrene, m-chlorostyrene, o-methyl-p-chlorostyrene, o-ethyl-p-chlorostyrene, o-methyl-p-isopropyl styrene, alpha-methyl styrene, p-methyl-alpha-methyl styrene, alpha-ethyl styrene, o,p-dimethyl-alpha-methyl styrene, m-chloro-alpha-methyl styrene, p-chloro-alpha-methyl styrene, p-isopropyl-alpha-methyl styrene, m-chloro-p-methyl-alpha-methyl styrene, mixtures of monovinyl aromatic compounds, etc. Styrene is a preferred monovinyl aromatic compound for use according to the invention, and the invention will be further described with particular reference to this compound. Where styrene is referred to subsequently, it is to be understood that other monovinyl aromatic compounds as defined herein can be employed in its place or in admixture therewith.

According to the present invention, a mixture of oxidized wax and styrene is first subjected to styrene-polymerizing conditions. Any suitable known conditions for polymerization of styrene can be employed. For example, the mixture can be maintained at an elevated temperature, preferably at least 100° C. and preferably at a temperature and pressure such that the styrene is in liquid phase, in the presence of a polymerization catalyst such as ditertiary butyl peroxide, benzoyl peroxide, hydrogen peroxide, tertiary butyl hydroperoxide, acetyl benzoyl peroxide, tertiary butyl perbenzoate, etc. The use of a catalyst is not strictly necessary, but is preferred according to the invention. The time required to obtain a suitable degree of polymerization depends on the temperature, and will generally be within the range from 5 to 50 hours.

The oxidized wax used according to the invention may have been prepared by any suitable method. Commonly employed conditions for oxidation of wax include oxidation temperature within the range from 200° F. to 300° F., oxidation pressure within the range from atmospheric pressure to 500 p.s.i.g., the use of a free-oxygen containing gas, e.g. air, oxygen, ozone, ozonized air, etc. as oxidizing agent, and the use of an oxidation catalyst of the well-known metallic oxidation catalyst type, e.g. manganese naphthenate.

The following example illustrates the invention:

Example I

A partially oxidized microcrystalline wax having saponification number of 85.7, acid number of 22.7, penetration at 77° F. (A.S.T.M. D217–44T) of 6, and S.U. viscosity at 210° F. of 552 seconds was prepared by oxidation of microcrystalline wax at 250 to 270° F. with air for 203.5 hours in the presence of manganese naphthenate in amount such that the oxidation mixture contained 0.04 weight percent of manganese.

250 grams of the partially oxidized wax were heated together with 100 ml. of xylene under refluxing conditions with mechanical stirring. To the heated solution of oxidized wax in xylene, 250 grams of styrene containing 2.5 grams of ditertiarybutyl peroxide were added dropwise with stirring. The reaction mixture was refluxed for 5 hours. The stirrer and condenser were then removed, and the contents of the flask heated to a liquid temperature of 160° C. at 25 mm. of Hg to remove unreacted styrene and xylene. 467.5 grams of a homogeneous product were left as residue. This product was allowed to stand overnight at 100° C. No separation into layers occurred. The following table shows a comparison of the properties of the original oxidized wax and the product obtained.

|  | Weight, g. | Sap. No. | Penetration at 77° F. |
|---|---|---|---|
| Original oxidized wax | 250 | 85.6 | 6 |
| Product | 467.5 | 43.8 | 0 |

100 parts by weight of the product were blended in the liquid state with 100 parts by weight of the original oxidized wax having penetration of 6 to obtain a homogeneous product having penetration of 2. 100 parts by weight of the latter product were blended with 100 additional parts by weight of the original oxidized wax to obtain a homogeneous product having penetration of 4.

These results show that products obtained by polymerization of styrene in the presence of oxidized wax can be blended with additional oxidized wax. However, when 100 parts by weight of preformed polystyrene were mixed with 100 parts by weight of the original oxidized wax, a heterogeneous product was obtained which separated at 100° C. into an oxidized wax layer (80 parts) and a polystyrene layer (120 parts) having saponification number of 18.8.

Heterogeneous products were also obtained in polymerizing mixtures containing relatively large amounts of oxidized wax relative to styrene. For example, in polymerization of 200 grams of partially oxidized petroleum microcrystalline wax having saponification number of 99 mg. of KOH per gram, acid number of 43 mg. of KOH per gram, penetration at 77° F. of 22, S.U. viscosity at 210° F. of 259 and melting point of 173° F., together with 50 grams of styrene, the polymerization being conducted in the presence of 100 grams of xylene under refluxing conditions (vapor temperature 138° C.) for 11 hours in the presence of one gram of ditertiary butyl peroxide: the product, after stripping out xylene and cooling to room temperature, separated into two layers each constituting about one-half of the total product. In another experiment where 250 grams of styrene were employed per 500 grams of the same oxidized wax, the products separated at 175° F. into a solid layer having saponification number of 43.7 and weighing 319 grams and a liquid layer having saponification number of 83.2 and weighing 403.6 grams.

According to the present invention, products having saponification number in the range from 20 to 120 mg. of KOH per gram and penetration at 77° F. less than 15 can be prepared from oxidized waxes having greater penetration and saponification number. The hardest products according to the invention, those having penetration less than 5, may have saponification number in the range from 20 to 80. Products having saponification numbers and penetrations outside the above-specified ranges can also be prepared according to the invention.

In the preceding example, oxidized microcrystalline wax was treated according to the invention. Paraffin waxes can also be beneficially hardened by the process of the invention.

This application is a continuation-in-part of copending application Serial No. 374,148, filed August 13, 1953, by the present inventor, and now abandoned.

The invention claimed is:

1. Method for preparation of saponifiable materials having low penetration which comprises: contacting partially oxidized petroleum wax having saponification number within the range from 30 to 150 mg. of KOH per gram with a monovinyl aromatic compound having the following formula:

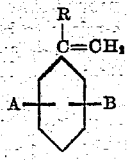

where R is selected from the group consisting of hydrogen, methyl and ethyl radicals, A is selected from the group consisting of hydrogen, halogen and alkyl radicals having 1 to 3 carbon atoms inclusive, and B is selected from the group consisting of hydrogen, halogen and alkyl radicals having 1 to 3 carbon atoms inclusive, the contacting being performed under conditions for polymerization of said monovinyl aromatic compound, and the weight ratio of oxidized wax to monovinyl aromatic compound in said contacting being within the approximate range from 1.5:1 to 1:5, thereby polymerizing said aromatic compound while in intimate contact with said partially oxidized petroleum wax; and admixing the polymerization product with additional partially oxidized petroleum wax having saponification number within the range from 30 to 150 mg. of KOH per gram, thereby to obtain a homogeneous product containing a greater amount of oxidized wax than the maximum amount which will form a homogeneous composition with the monovinyl aromatic compound polymer in direct polymerization of the monovinyl aromatic compound in the presence of oxidized wax, said amount of oxidized wax being within the range from 65 to 95 weight percent based on the vinyl polymer-oxidized wax mixture.

2. Method according to claim 1 wherein said monovinyl aromatic compound is styrene.

3. Method according to claim 1 wherein said partially oxidized petroleum wax is partially oxidized microcrystalline wax.

4. Method according to claim 1 wherein said polymerizing is performed at a temperature of at least about 100° C. in liquid phase in the presence of a polymerization catalyst.

References Cited in the file of this patent

UNITED STATES PATENTS

| | | |
|---|---|---|
| 1,983,672 | Labarthe et al. | Dec. 11, 1934 |
| 2,127,381 | Herrmann et al. | Aug. 16, 1938 |
| 2,733,224 | Smith et al. | Jan. 31, 1956 |

FOREIGN PATENTS

| | | |
|---|---|---|
| 649,013 | Great Britain | Jan. 17, 1951 |